United States Patent [19]
Callan

[11] Patent Number: 6,105,023
[45] Date of Patent: *Aug. 15, 2000

[54] SYSTEM AND METHOD FOR FILTERING A DOCUMENT STREAM

[75] Inventor: Jamie Callan, Easthampton, Mass.

[73] Assignee: Dataware Technologies, Inc., Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/912,757

[22] Filed: Aug. 18, 1997

[51] Int. Cl.$^7$ .................................................. G06F 17/30

[52] U.S. Cl. ................................... 707/5; 707/3; 707/104

[58] Field of Search ............................... 707/2, 3, 5, 104, 707/102, 103, 501, 515, 4; 345/440, 901; 364/282, 281, 253; 704/7, 8, 9, 260

[56] References Cited

U.S. PATENT DOCUMENTS

| 5,265,065 | 11/1993 | Turtle | 395/600 |
|---|---|---|---|
| 5,418,948 | 5/1995 | Turtle | 395/600 |
| 5,488,725 | 1/1996 | Turtle et al. | 707/5 |
| 5,671,403 | 9/1997 | Shekita et al. | 395/603 |
| 5,717,914 | 2/1998 | Husick et al. | 707/5 |
| 5,737,734 | 4/1998 | Schultz | 707/5 |
| 5,742,816 | 4/1998 | Barr et al. | 707/104 |

OTHER PUBLICATIONS

Allan et al., "Inquery at TREC–5," presented at *The Fifth Text Retrieval (TREC–5) Conference,* National Institute of Standards and Technology, Gaitherburg, Maryland, Nov. 20, 1996, 14 pages.

Callan, Jamie, "Document Filtering with Inference Networks," presented at *The Nineteenth Annual International ACM SIGIR Conference on Research and Development in Information Retrieval,* Zurich, Switzerland, Aug. 18, 1996, 8 pages.

Callan et al., "The INQUERY Retrieval System," In *Proceedings of the Third International Conference on Database and Expert Systems Applications,* Valencia, Spain, Springer–Verlag, 1992, pp. 78–83.

Callan et al., "TIPSTER Phase 2 Activities: The University of Massachusetts at Amherst," TIPSTER Text Phase II 24–Month Workshop, Tysons Corner, Virginia, May 5, 1996, 17 pages.

"In Route Effectiveness," Center for Intelligent Information Retreival (CIIR) Industrial Advisory Board (IAB) Meeting, University of Massachusetts, Amherst, Massachusetts, Apr. 23, 1996, 10 pages.

Salton, Gerald, "The Smart Project in Automatic Document Retrieval," in *Proceedings of the Fourteenth Annual International ACM/SIGIR Conference on Research and Development in Information Retrieval,* Chicago, Illinois, 1991, pp. 356–358.

(List continued on next page.)

Primary Examiner—Wayne Amsbury
Assistant Examiner—Thu-Thao Havan
Attorney, Agent, or Firm—Hill & Simpson

[57] ABSTRACT

A system for filtering documents and includes a document parser, a profile parser, and a comparator. The document parser accepts incoming documents as input and provides inverted lists of terms contained in the document's output. The profile parser accepts as input user queries and provides as output query nets representing the user queries. The comparator compares the inverted lists representing the documents against the query that is representing the user queries to determine if an incoming document matches a user query. A related method for filtering incoming documents includes the steps of receiving an incoming document and parsing it to produce an inverted list of terms contained in the incoming document. The inverted list is then used to retrieve user queries. Any user queries matching less than a pre-determined number of terms are immediately discarded. The remaining user queries are scored and user queries having a score less than a predetermined threshold are discarded. The remaining user queries are the queries which the incoming document matches.

16 Claims, 2 Drawing Sheets

OTHER PUBLICATIONS

Brown, E., *An Approach for Improving Performance in Inference Network Based Information Retrieval,* Umass Technical Report 94–73, University of Massachusetts, Amherst, Massachusetts, Sep., 1994, 33 pgs.

Brown, E., *Execution Performance Issues in Full–Text Information Retrieval,* PhD. dissertation, Umass Technical Report TR95–81, University of Massachusetts, Amherst, Massachusetts, Oct., 1995, 196 pgs.

Brown, E., "Fast Evaluation of Structured Queries for Information Retrieval," presented at *The 18th International AGM SIGIR Conference on Research and Development in Information Retrieval,* Seattle, WA, Jul. 9, 1995, 9 pgs.

Haines, David, *Adaptive Query Modification in a Probabilistic Information Retrieval Model,* Ph.D. Dissertation, Umass Technical Report, TR96–61, University of Massachusetts, Amherst, Massachusetts, Sep., 1996, 177 pgs.

Kalt, T., *A New Probabilistic Model of Text Classification and Retrieval,* Center for Intelligent Information Retrieval Technical Report, University of Massachusetts, Amherst, Massachusetts, Jan. 29, 1996, 9 pgs.

Krovetz, Robert, *Word Sense Disambiguation for Large Text Databases,* Ph.D. dissertation, University of Massachusetts, Amherst, Massachusetts, May, 1995, 116 pgs.

Lu, Z., Callan, J. and Croft, W.B., *Applying Inference Networks to Multiple Collection Searching,* Umass Technical Report TR96–42, University of Massachusetts, Amherst, Massachusetts, Mar., 1996, 2 0 pgs.

Xu, J., Broglio, J. and Croft, W.B., *The Design and Implementation of a Part of Speech Tagger for English,* Umass Technical Report, CMPSC1 TR94–26, University of Massachusetts, Amherst, Massachusetts, Aug., 1994, 14 pgs.

SYSTEM AND METHOD FOR FILTERING A DOCUMENT STREAM

FIELD OF THE INVENTION

The present invention relates to information retrieval techniques and, in particular, to techniques for efficiently filtering a document stream based on the minimum number of query terms a document must possess to satisfy a query profile.

BACKGROUND OF THE INVENTION

Although statistical retrieval models are now accepted widely, there has been little research on how to adapt them to the demands of high-speed document filtering. The problems of document retrieval and document filtering are similar at an abstract level, but the architectures required, the optimizations that are possible, and the quality of the information available, are all different.

Retrieval of documents from an archival collection (retrospective retrieval) and filtering documents from an incoming stream of documents (document filtering or selective dissemination of information) have been described as two sides of the same coin. Both tasks consist of determining quickly how well a document matches an information need. Many of the underlying issues are the same; for example, deciding how to represent each document, how to describe the information need in a query language, what words to ignore (e.g., stop words), whether or not to stem words, and how to interpret evidence of relevance.

Many document filtering techniques are based on the assumption that effective document retrieval techniques are also effective document filtering techniques. However, when filtering research is conducted with a retrieval system, important issues can be overlooked. Different architectures are possible, and perhaps required, to rapidly compare persistent information needs to transient documents. A filtering algorithm must make decisions based upon incomplete information; it may know what has happened in the past, but it generally cannot know, nor can it generally wait to know, what documents will be seen in the near future. Traditional corpus statistics, such as inverse document frequency (idf), have different characteristics when documents are encountered one-at-a-time. These issues are important, because they determine how efficient and effective statistical document filtering systems will be in "real world" environments.

Document filtering, also known as selective dissemination of information (SDI) is generally based on an unranked Boolean retrieval model. A user's information need is expressed by a query, also called a profile, in a query language. Sometimes a profile is actually a set of queries for one user; in this discussion, query and profile are considered synonymous. Queries are typically expressed for the purposes of this discussion using Boolean logic. A query either matches or does not match a document. There is no ability to partially satisfy a query, or to determine how well a document matches or satisfies a query. Instead, the emphasis is on speed, and on indexing methods that enable very fast processing of documents against profiles.

In one example of these classes of systems, each Boolean profile is analyzed to identify the least frequent trigram (LFT) that must occur whenever the profile matches a document (a necessary, but not sufficient, condition for matching). Documents are converted into a restricted alphabet, and represented as a sequence of trigrams. For each profile, a table lookup determines whether its LFT is present. If not, the profile can not possibly match the document. This first stage is designed to eliminate greater than 95% of the profiles in just a few instructions each. If a profile's LFT is present, a slower second stage determines whether the document actually satisfies the Boolean query.

It is generally accepted that statistical systems provide better precision and recall for document retrieval than do unranked Boolean systems. The growing power of computer hardware has made statistical systems increasingly practical for even large scale document filtering environments. A common approach has been to simulate document filtering with an existing vector-space or probabilistic document retrieval system on a collection of new or recent documents. This approach is simple, effective, and has the advantage of a corpus from which to gather statistics like idf. However, it is not well-suited to immediate dissemination of new information, and it adds index creation, storage, and maintenance to the cost of document filtering.

SUMMARY OF THE INVENTION

A new profile selection technique for structured queries is described which has a dramatic effect on filtering speed. Prior to filtering, each profile is analyzed to determine the number of document terms it must match before a document can exceed the dissemination threshold. The "optimal" document for a query term is one in which ntf approaches 1. The estimate for the minimum number of terms required is made by setting ntf to 1 for each query term, and then ordering sibling query net nodes by the estimated belief values. When reordering is complete, the query net is traversed, accumulating belief values and counting query terms. When the accumulated belief exceeds the dissemination threshold, the minimum number of terms necessary to exceed the threshold is known. This information can be stored in the profile index, and used during document filtering. The profile is selected only if it matches a sufficient number of document terms.

In one aspect, the present invention relates to an apparatus for filtering documents as those documents are received. The apparatus includes a document parser which accepts incoming documents as input and outputs inverted lists of terms contained in the documents. The apparatus also includes a profile parser which accepts user queries as input and provides a query net representing user queries as output. A comparator is provides that compares the inverted list for an incoming document against a query net representing a user query and provides an output and indication of whether the incoming document matches the user query.

In another aspect, the present relates to a method for filtering incoming documents. The method begins by receiving an incoming document and parsing it to produce an inverted list of terms contained in the incoming document. The inverted list is then used to retrieve user queries and user queries matching less than a predetermined number of terms are immediately discarded. Each remaining query is scored and those user queries having a score less than the predetermined threshold are discarded.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1:
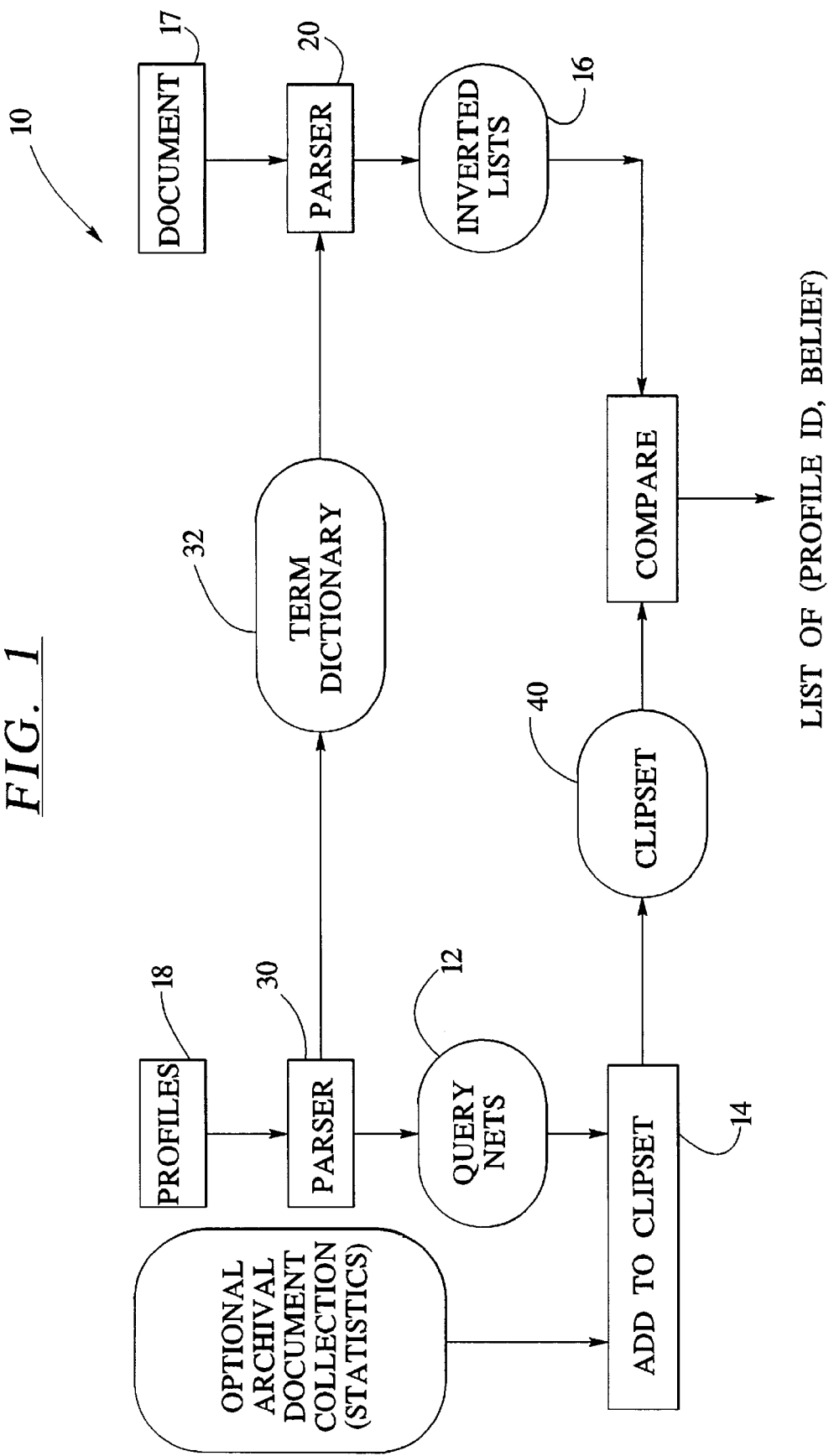
FIG. 1 is a block diagram of the system of the present invention.

Referring now to FIG. 1, a document filtering system 10 based upon the inference network model of information retrieval and filtering is shown. The major tasks performed by the system are creation of query networks 12, creation of document networks (clipsets) 14, and use of the clipsets 14 to filter documents. The document network is created automatically by mapping documents onto content representation nodes, which are implemented with traditional inverted lists 16. Query networks are specified by a user using either natural language or a structured query language profiles 18. Although the query language may be a traditional Boolean language, it is preferred to use a query language which includes probabilistic AND, OR, and NOT operator, proximity operators, probabilistic phrase and passage operators, and a weighted sum operator for user-specified weights. Document filtering is performed by using recursive inference to propagate belief values through the inference net, discarding any documents whose belief is below a dissemination threshold.

A query network 12 is a directed acyclic graph (DAG) in which the root is a query operator (e.g. #SUM), internal nodes correspond to nested query operators (e.g., AND, OR, phrase, proximity, or other operators), and leaves correspond to query terms. When a supplied user profile 18 is completely parsed, the DAG is optimized, by removing redundant query terms and operators, reordering arguments to Boolean operators, minimize the cost of evaluating the query.

Retrospective document retrieval systems may optimize a query by removing query fragments not found in the document corpus. For example, if the word "retrieval" does not occur in the collection, the query "information AND retrieval" cannot match any document in the corpus. This optimization is not useful in document filtering applications, however, because the system 10 sees the query before seeing any documents. However, the same principle applies to document parsing. The document parser 20 can discard any document term that does not occur in at least one profile 18. Therefore the query parser maintains a dictionary of terms 32 that occur in profile 18 that may be used by the document parser 20.

The system compares a single document at a time to a clipset 40. A clipset 40 is a set of query networks 12, each representing a different profile 18, and a set of profile-specific dissemination thresholds between 0.0 and 1.0. Clipsets may be persistent. When a user adds, deletes or modifies an information need, the corresponding query network is added to, deleted from, or modified in the clipset 40. The clipset resides entirely in random-access memory during document filtering memory.

The persistence of the clipset 40 makes it possible to cache information that is transient in traditional document retrieval. For example, inverse document frequency (idf) and default belief values are typically calculated, used, and subsequently discarded by traditional systems performing retrospective document retrieval. Document statistics are calculated once, when the query net 12 is added to the clipset 40, and then retained in the nodes of the query net 12 to improve the speed of document filtering. Each node in the query net 12 can be associated with space from a buffer pool, so that the overhead of allocating and freeing dynamic memory is avoided during document filtering.

The desire to cache information in the query nets 12 is offset by the need to represent query nets 12 efficiently. A system in a commercial environment might need to filter tens of thousands of profiles 18 on a single processor. If each node in an query net 12 requires 100 bytes, 100,000 profiles could be stored, with an average of 22 terms and operators each, in approximately 256 MB of memory.

Adding, deleting, and modifying profiles is accomplished quickly, due to the independence of profiles from one another and the unordered nature of the clipset 40. New profiles 18 can be appended to the end of the clipset 40. Modification can be effected by parsing the modified profile into a query net, switching a clipset printer from one query net to another, and freeing the old query net. Deletion can be effected by freeing a query net, and moving the last profile in the clipset up to fill the hole created by deletion.

Much of what is known about document parsing and indexing for retrospective document retrieval may be applied to document filtering. For example, recognizing document structure (beginning, end, title, author, date, etc.), removal of frequent words (stopwords), and removal of word suffixes (stemming) are all important in both retrieval and filtering. However, in a document filtering environment, a document enters the system, is parsed and indexed, is filtered or routed to the appropriate user, and is then discarded. There is no reason to incur the input/output cost of writing documents or their indices to disk.

Indexing speed can be maximized by creating inverted lists only for terms that actually appear in one or more profiles. As a result, most of the tokens in a document are discarded as soon as they are recognized.

Documents 17 are supplied, one at a time, by an application program. A lexical scanner identifies document markup, discards stopwords, and performs word stemming. Stems that do not appear in the profile term dictionary are discarded. Inverted lists 16 are constructed, incrementally as tokens are encountered, for the remaining stems. When the document is parsed completely, the result is a set of inverted lists representing the document network for that document. Finally, each list is annotated with the belief that the term will contribute. Belief is calculated using tf idf formula, as shown below.

$$ntf = 0.04 + 0.6 \cdot \frac{tf}{tf + 0.5 + 1.5 \cdot \frac{dl}{\text{avg\_dl}}}$$

$$idf = \frac{\log\left(\frac{C + 0.5}{df}\right)}{\log(C + 1.0)}$$

$$bel_{term}(t) = 0.4 + 0.6 \cdot ntf \cdot idf$$

where:
 tf is the frequency of term t in the document,
 dl is the document length,
 avg_dl is the average document length in the collection,
 C is the number of documents in the collection, and
 df is the number of documents in which term t occurs.

Three of the statistics above are derived from the corpus as a whole: df avg_dl, and C. Accurate values for these three statistics are known only after all documents are filtered, so filtering generally must be performed only with estimates.

Parsing a 3,000 byte document and later freeing the associated indices and data structures using the described method takes 0.02937 seconds of wall-clock time on an otherwise idle DECStation 3000-6000 equipped with 64 megabytes of memory and running at 175 Mhz, manufactured by Digital Equipment Corporation of Maynard, Mass.

Document parsing speed is affected by the number of profiles 18, because inverted lists 16 are built only for terms in the profile term dictionary 32. As more profiles 18 are added, the vocabulary grows larger. Fortunately, adding a large number of profiles 18 causes only a small increase in the size of the term dictionary 32, and therefore only a small decrease in document parsing speed.

After a document is indexed, it can be compared to a clipset 40. Retrospective document retrieval systems owe their speed partially to indexing methods, such as inverted lists, that enable the system to consider only those documents that have terms in common with a query. A similar need exists for document filtering, because many profiles have nothing in common with most documents.

Once a set of profiles is selected, each profile must be compared to an incoming document. One embodiment iterates through the selected profiles, determining for each the belief that the document satisfies the information need. The belief in a document for a particular query net is determined with depth-first evaluation. For each query term that occurs in the document, this embodiment must locate the appropriate inverted list, lookup the belief associated with the term, and then combine the belief with the beliefs from other terms, according to the probabilistic operators being used. If proximity operators are used, this embodiment must also lookup the locations where the term occurs, intersect those with the locations of other proximate terms, and then compute the belief for the proximity operator dynamically, using the same tf.idf formulas described above.

A profile is returned for a document if and only if it matches the query, and if the belief that the document satisfies the information need exceeds a profile-specific, user-supplied dissemination threshold. This latter requirement is particularly important for probabilistic query operators. A document "matches" a weighted sum or probabilistic ("fuzzy") AND operator if even one query term is present, although the belief in the document is usually low. This behavior is rarely a problem in a ranked retrieval system with large sets of documents, because a low belief causes a document to appear low in the rankings. However, in a filtering environment, a low-scoring document may still be the best document encountered that day. If the system does not discard documents with low beliefs, users must either develop strictly Boolean queries, or wade through irrelevant documents on days when no relevant documents occur.

Filtering a 3,000 byte document for 1,000 Boolean profiles, each containing an average of 22 terms and operators, takes 0.024 seconds of wall-clock time on an otherwise idle DECStation 3000-600, manufactured by Digital Equipment Corporation of Maynard, Mass. The time is proportional to the number of profiles; twice as many profiles takes twice as long. In one experiment a 109 megabyte file of 39,906 Wall Street Journal documents was processed against 1,000 Boolean profiles in 25 minutes of wall-clock time, generating 616,487 matches. A similar experiment with 1,000 statistical profiles of similar complexity required 33 minutes.

EXPERIMENTS

One important difference between document filtering and document retrieval is how corpus-wide statistics like inverse document frequency (idf) and average document length are obtained. The effectiveness of current retrieval models depends upon accurate corpus statistics, which document retrieval systems gather while indexing the collection. In an on-line environment, where documents must be filtered as soon as they arrive, accurate corpus statistics are not available until after all of the documents have been filtered. One approach used in some experiments was to use statistics from another, presumably similar, corpus. This approach is effective, but it may be impractical in practice. Obtaining idf values from a retrospective corpus can be expensive, particularly if queries include large numbers of proximity operators. Idf values for unindexed query fragments (e.g. proximity operators) can only be obtained by running queries against the retrospective collection. In one experiment, it took several hours to obtain the idf values for proximity operators in 50 routing queries. This cost would be prohibitive in a "real world" setting.

An alternate approach is to estimate corpus statistics dynamically as each document is encountered. This approach has the advantage of being "low cost" and of not requiring a similar training corpus. Although the corpus statistics will initially be inaccurate, they eventually converge to their "true" values for the corpus.

Experiments were performed to study idf values on a small corpus, because it converges relatively quickly. Average document length was studied on a larger corpus, because it converges less quickly.

Figure 2:
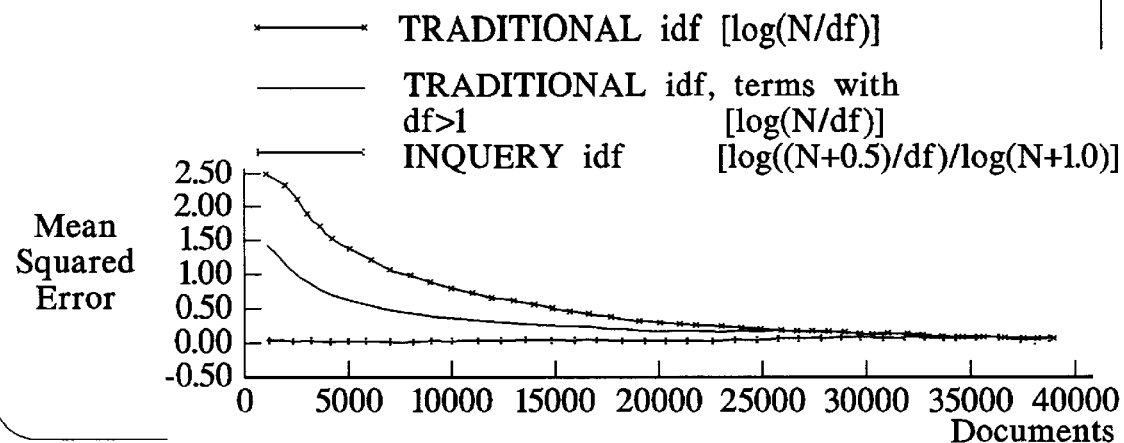
FIG. 2 is a graph showing mean squared error as a function of the number of documents encountered.

FIG. 2 shows the convergence of idf values for terms in the 1988 Wall Street Journal corpus. Each curve shows the mean square error (MSE) between estimated idf and true idf at 1,000 document increments. The top curve shows the MSE for a traditional method of computing idf. The bottom curve shows the MSE for the "scaled" idf used by the INQUERY document retrieval product manufactured by Sovereign Hill Software, Inc. of Dedham, Mass.

Figure 3:
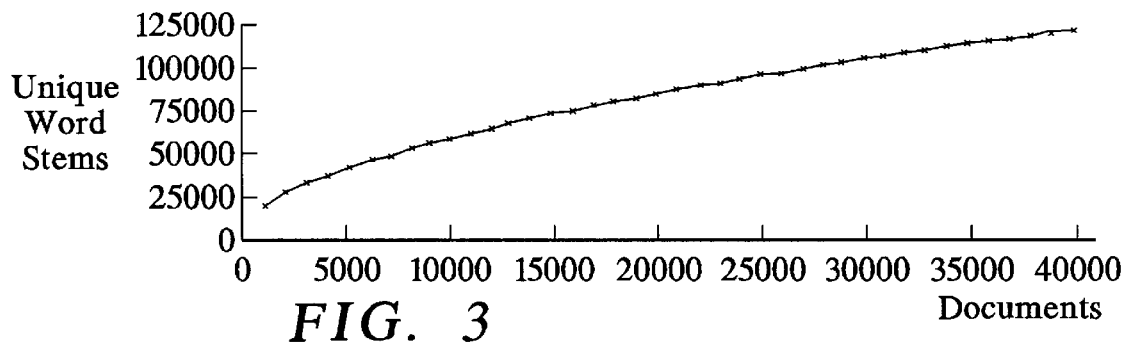
FIG. 3 is a graph showing the number of unique word stems encountered in a corpus as a function of the number of documents encountered.

Idf values converged rapidly to their true values (FIG. 2), even as the vocabulary continued to grow (FIG. 3). A "scaled" idf converges more rapidly, because it gives a more accurate estimate for terms that occur just once. An unscaled idf for terms that occur just once changes significantly as more documents are observed, while a scaled idf changes very little. If terms that occur just once are excluded (middle curve), the MSE for the traditional method is reduced by about half.

Figure 4:
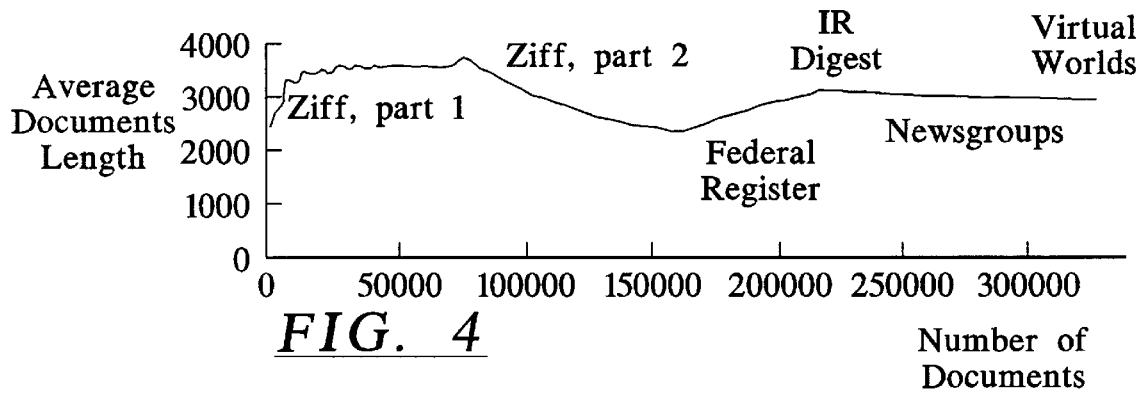
FIG. 4 is a graph showing average document length as a function of the number of documents encountered.

FIG. 4 shows the convergence of average document length for the TREC-4 Routing corpus. It takes about 25,000 documents to reach a stable estimate, but the estimate then changes significantly whenever the document stream shifts from one subcollection to another.

Figure 5:
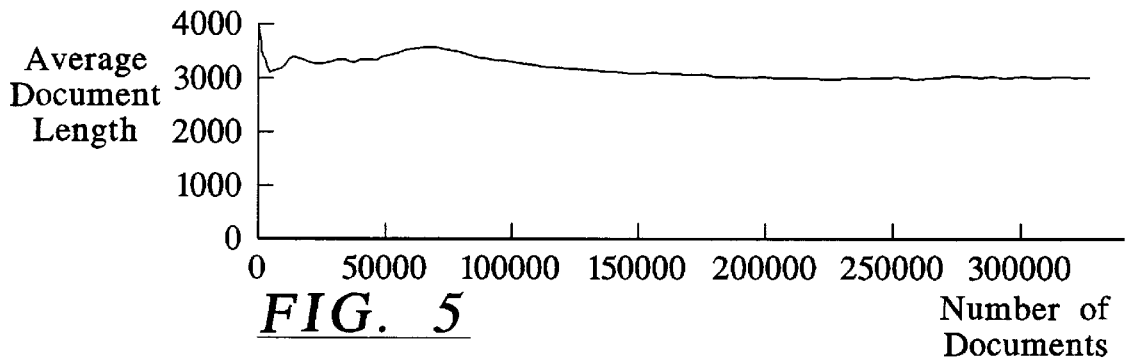
FIG. 5 is a graph showing the average document length as a function of the number of documents encountered.

The effect of shifting from one subcollection to another can be eliminated by interleaving the subcollections. Although the documents could be ordered by publication date, doing so does not eliminate the "subcollection" effect because the subcollections cover different periods of time. FIG. 5 shows the convergence of average document length in a proportionally interleaved TREC-4 Routing corpus. It takes about 20,000 documents to reach a stable estimate in this corpus, but the estimate is 15% above its eventual final value, and it continues to drift up and down, smoothly but by significant amounts, for another 100,000 documents.

TABLE 1

| | Number of Documents Used Only For Training | | | | | | |
|---|---|---|---|---|---|---|---|
| Precision | 0 | 1000 | 3000 | 5000 | 10000 | 15000 | 20000 |
| at 5 docs | −18.7% | −16.1% | −11.8% | −8.1/% | −3.1% | −3.7% | −3.1% |
| at 10 docs | −16.4% | −13.8% | −10.9% | −9.0% | −3.9% | −2.9% | −3.5% |
| at 15 docs | −16.0% | −11.9% | −9.9% | −7.0% | −3.5% | −2.2% | −1.1% |
| at 20 docs | −14.7% | −13.2% | −10.5% | −8.5% | −5.4% | −3.8% | −2.7% |
| at 30 docs | −13.6% | −12.2% | −10.0% | −9.1% | −5.7% | −3.5% | −3.4% |
| at 100 docs | −9.9% | −11.2% | −9.2% | −8.1% | −5.8% | −5.3% | −4.7% |
| at 200 docs | −2.8% | −9.1% | −8.1% | −7.3% | −5.3% | −5.3% | −5.3% |
| at 500 docs | +4.4% | −3.9% | −3.3% | −3.0% | −2.8% | −4.0% | −5.3% |
| Avg | −8.0% | −12.1% | −10.7% | −10.7% | −6.9% | −7.2% | −7.8% |

An experiment with TREC-4 Routing queries and documents investigated the effects on recall and precision of learning corpus-wide statistics during filtering.

InFilter, a routing component of the INQUERY product, was run twice on the TREC-4 corpus (935 MB, 329,780 documents) and INQ203 Routing queries (50 queries, 50 terms and 200 proximity pairs each). In one run, corpus statistics were available a priori ("perfect" statistics). In the other, estimates were updated as each document was encountered ("learned" statistics). The experiment required dissemination thresholds that would disseminate at least 1,000 documents for each query. We used the documents score that INQUERY assigned at rank 1,000, because it was conveniently available.

Learned corpus statistics produced a significant loss in average precision at all cutoffs and levels of recall (Table 1, Column "0"). The effect of inaccurate corpus statistics in the first few thousand documents is rather dramatic, given that the estimates converge to relatively accurate values after filtering only a small percentage of the corpus. However, analysis reveals that learned statistics produce substantially higher scores for documents filtered "early" than for documents filtered "later", when corpus statistics have converged. The "early" documents, with their overly generous scores, dominate the top of the rankings.

If the first several thousand documents re used only for training purposes (i.e., are not disseminated), the effect of learned corpus statistics on recall and precision is less significant (Table 1, columns "1000" to "20000"). for example, if 15,000 documents are used for training, corpus statistics produce a 2.5–5.3% loss in precision at cutoffs 5–500. This is a crude way of analyzing the effects of learning corpus statistics, because the baseline is based on all of the relevant documents, while the filtered set is missing whatever relevant documents were discarded during training. However, it confirms that, after the initial period of training, learned corpus statistics are effective for filtering.

Speed is an important characteristic of document filtering systems, and consequently techniques for optimizing Boolean filtering systems are well-known. Similar techniques for statistical document filtering are required.

Filtering a document involves profile selection and evaluation. Profile selection determines which profiles to evaluate; profile evaluation determines how well a document satisfies a profile. For each document, the goal is to spend either no time or nearly no time on most of the profiles.

One approach is to index profiles with inverted lists. The terms in a document "retrieve" profiles during filtering. This approach works particularly well with the unstructured queries that characterize vector-space systems, because profile scores can be computed when inverted lists are merged.

Profile indexing is less effective with the structured queries that characterize inference network systems, because scores for structured queries cannot be computed when profile inverted lists are merged, that is, the inference network can simply be turned "upside down." In this case, profile indexing can be used only to identify profiles that are candidates for evaluation. Profile indexing may also be less effective on long routing queries, because a profile with many terms is more likely to have at least one in common with any document.

Using the method described above, an estimate for the minimum number of necessary terms is obtained with an algorithm similar to algorithms that reorder and/or optimize unstructured queries and Boolean queries. Reordering by optimal belief is perhaps a more general technique, because it applies to both unstructured queries and queries structured with a wide range of Boolean and probabilistic operators. However the important difference is that the query is not reordered to optimize query evaluation (although doing so is a good idea), but to find the minimum number of terms necessary to select a profile.

The method can be described as implemented as a three stage filter. First, document terms "retrieve" profiles, using inverted lists. The number of terms matching each profile is determined as inverted lists are merged. Next, "retrieved" profiles that don't match enough document terms are discarded. Finally, the remaining profiles are evaluated completely, and any with scores below the dissemination threshold are discarded.

The speedup obtained with the described method increases as a profile's dissemination threshold increases. If the threshold is low, the minimum number of terms necessary to select a profile is one, reducing the method to simple profile indexing.

The described method can be a "safe" or "unsafe" optimization, depending upon how it is used. If profiles are reanalyzed each time the idf values change, it is safe, i.e., guaranteed to select for a given document every profile that can possibly exceed the dissemination threshold. If idf values change, as when they are being learned, the estimate may become wrong. Usually the estimate will be an underestimate, causing no harm, because idf values can fall rapidly (increasing the actual number of necessary terms), but tend to rise slowly (decreasing the actual number of necessary terms). However, it may make sense to reanalyze profiles periodically, for example every few thousand documents, when idf values are being learned.

The relative effectiveness of these techniques is demonstrated in two experiments. In on experiment, the TREC 1988 Wall Street Journal corpus (109 MB, 39,906 documents) was filtered for a set of 3,000 simple, artificially-generated profiles (10 terms and 4 proximity pairs each). The dissemination threshold was set to yield about a 0.2% "hit" rate. In the second experiment, the TREC-4 Routing corpus (935 MB, 329,780 documents) was filtered for a set of 50 complex profiles (50 terms and 200 proximity pairs each). The dissemination threshold was set to yield about 1,000 documents per profile (a 0.3% "hit" rate), as is common in TREC Routing evaluations. In both experiments InFilter was learning corpus statistics, so profiles were re-analyzed and their MinTerm estimates updated every 1,000 documents.

With simple profiles (the 1988 WSJ experiment), simple profile indexing was a substantial improvement over evaluating all profiles. Filtering time was reduced by 37.5% without impacting effectiveness. Estimates for the number of necessary terms were updated every 1,000 documents. Table 2 below summarizes the results.

|  | 3,000 simple profiles 1988 WSJ corpus | | | 50 complex profiles TREC-4 Routing corpus | | |
| --- | --- | --- | --- | --- | --- | --- |
|  | No. Index | Inverted hidex | Min Term Index | No. Index | Inverted Index | Min Term Index |
| Profiles Fully Evaluated | 100% | 24.2% | 4.25% | 100% | 97.5% | 74.9% |
| Total Filtering Time (h:mm) | 1:28 | 0.55 | 0:41 | 5:26 | 5.31 | 2:53 |
| Filtering Rate (MB/hour) | 74 | 119 | 160 | 172 | 170 | 324 |
| Avg Documents Disseminated Per Profile | 77.8 | 77.8 | 77.8 | 999.5 | 999.5 | 922.0 |

With simple profiles (the 1988 WSJ experiment), simple profile indexing was a substantial improvement over evaluating all profiles. Filtering time was reduced by 37.5% without impacting effectiveness. MinTerm Indexing reduced filtering time by another 25%.

With complex profiles (the TREC-4 Routing experiment), simple profile indexing was slightly worse than evaluating all profiles. The computational cost of simple profile indexing provided little benefit, because most documents had a term in common with most of these routing profiles. However MinTerm Indexing, which considers the number of terms a document has in common with a profile, reduced filtering time by 47%.

MinTerm indexing was "unsafe" in these experiments, because corpus statistics were updated after each document but profile MinTerm estimates were updated after each 1,000 documents. In the 1988 WSJ experiment, the cost was the lost of one document from a set of 233,735. In the TREC-4 corpus, the cost was a much higher 76.5 documents per profile.

Most of the TREC-4 loss was due to experimental error. The algorithm that determined the number of terms a document and profile have in common did not consider the effect of duplicate terms in the profile. Duplicates are very rare in the 1988 WSJ profiles, so this error had no effect on the first experiment. Duplicates are quite common in the TREC-4 profiles, hence the "missed" documents in the second experiment.

Having described certain embodiments of the invention, it will now become apparent to one of ordinary skill in the art that other embodiments incorporating the concepts of the invention may be used. Therefore, the invention should not be limited to certain embodiments, but rather should be limited only by the spirit and scope of the following claims.

What is claimed is:

1. An apparatus for filtering documents as received, the apparatus comprising:

a document parser, said document parser accepting a document as input as it is received and providing an inverted list of terms contained in the document as output;

a profile parser, the profile parser accepting a user query comprised of terms and operators as input and providing a query net representing a parsed user query as output; and a comparator that compares the inverted list for an incoming document against the query net representing the parsed query and providing as output an indication whether the incoming document matches the parsed query, wherein, the apparatus is programmed to filter documents using recursive statistical inference in which numerical weights assigned respectively to the query terms are combined as dictated by the query operators and in which evaluation of one level of a query tree pauses while evaluation of another lower level proceeds.

2. The apparatus of claim 1 wherein said profile parser provides as output a term dictionary containing the query terms from the parsed user query, and wherein the document parser uses said term dictionary to eliminate terms from said inverted list.

3. The apparatus of claim 1 wherein said profile parser accepts a plurality of user queries and stores a corresponding plurality of query nets in a memory element.

4. The apparatus of claim 3 wherein said comparator compares an inverted list associated with an incoming document against each of said plurality of stored query nets.

5. The apparatus of claim 1 wherein said comparator provides an indication that the incoming document matches the user query if said inverted lists contain a minimum number of terms contained in the query net.

6. The apparatus of claim 1 wherein said profile parser, said document parser, and said comparator reside on separate machines, said separate machines interconnected by a network.

7. A method for filtering incoming documents, the method comprising the steps of:

(a) receiving an incoming document and parsing it to produce an inverted list of terms contained in incoming document;

(b) receiving one or more user queries and parsing same into query nets comprised of query terms and operators;

(c) using the produced inverted list to retrieve the query nets representing user queries by using recursive statistical inference in which numerical weights assigned respectively to the query terms are combined as dictated by the query operators and in which evaluation of one level of a query tree pauses while evaluation of another lower level proceeds;

(d) discarding retrieved query nets matching less than a predetermined number of terms;

(e) scoring remaining profile and discarding profiles having a score less than a predetermined threshold.

8. The method of claim 7 further comprising that step of storing all query nets associated with a user as a clipset.

9. The method of claim 8 further comprising the step of storing corpus statistics in the clipset.

10. The method of claim 7 further comprising the step of storing an inverted list associated with an incoming document.

11. An article of manufacture having computer-readable program means for filtering incoming documents, the article comprising:

(a) computer-readable program means for receiving an incoming document and parsing it to produce an inverted list of terms contained in incoming document;

(b) computer-readable program means for receiving user queries and parsing the user queries to produce query nets containing query terms and query operators representing the queries;

(c) computer-readable program means for using the produced inverted list to retrieve query nets representing user queries by using recursive statistical inference in which numerical weights assigned respectively to the query terms are combined as dictated by the query operators and in which evaluation of one level of a query tree pauses while evaluation of another lower level proceeds;

(d) computer-readable program means for discarding retrieved query nets matching less than a predetermined number of terms;

(e) computer-readable program means for scoring remaining profile and discarding profiles having a score less than a predetermined threshold.

12. The article of manufacture claim 11 further comprising computer-readable means of storing all query nets associated with a user as a clipset.

13. The article of manufacture of claim 12 further comprising computer-readable means of storing corpus statistics in the clipset.

14. The article of manufacture of claim 11 further comprising computer-readable means of storing an inverted list associated with an incoming document.

15. An apparatus for filtering documents as received, the apparatus comprising:

a profile parser, the profile parser accepting at least one structured query comprised of terms and operators as input and providing as output a query net representing a parsing of the at least one query;

a document parser, said document parser accepting a document as input as it is received and providing an inverted list of terms contained in the document as output; and a recursive statistical inference comparator that compares the inverted list for the document against the query net using statistical inference weighting for the query terms and providing as output an indication whether the document matches the at least one query, wherein, the apparatus is programmed to filter documents using recursive statistical inference in which numerical weights assigned respectively to the query terms are combined as dictated by the query operators and in which evaluation of one level of a query tree pauses while evaluation of another lower level proceeds; and the apparatus is programmed to count the number of inverted list terms matching the query and to disregard the query if the count falls below a predetermined threshold.

16. The apparatus of claim 15 wherein the document parser is configured to generated said inverted list of terms for a document only to an extent dictated by a dictionary file, said dictionary file containing terms in the at least one query net.

* * * * *